Jan. 28, 1969     R. A. FULGHUM     3,424,481
CLOSURE FITTING FOR DRUMS
Filed March 29, 1967
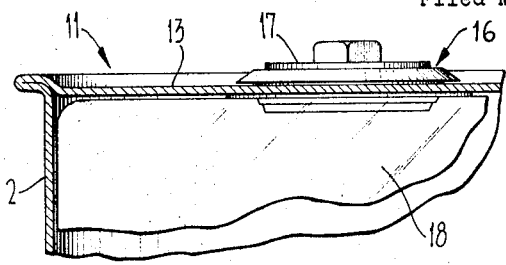
FIG_1
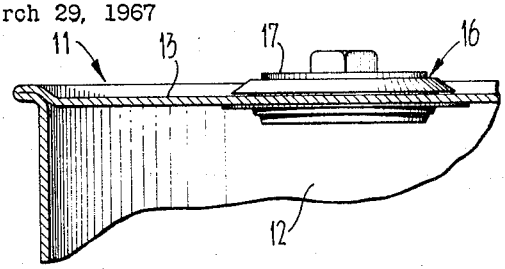
FIG_2
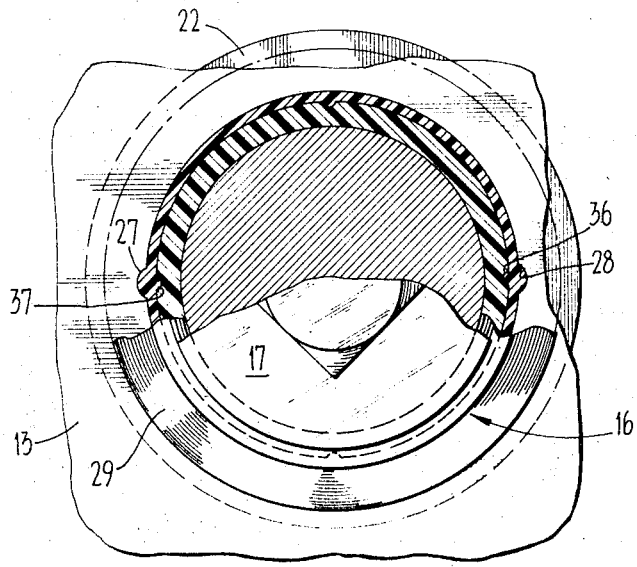
FIG_4
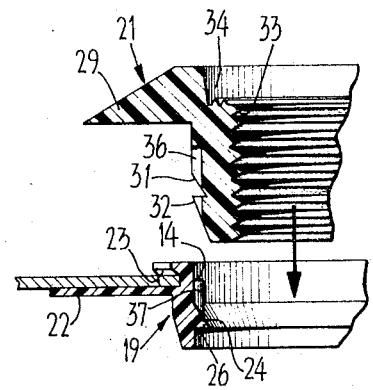
FIG_3
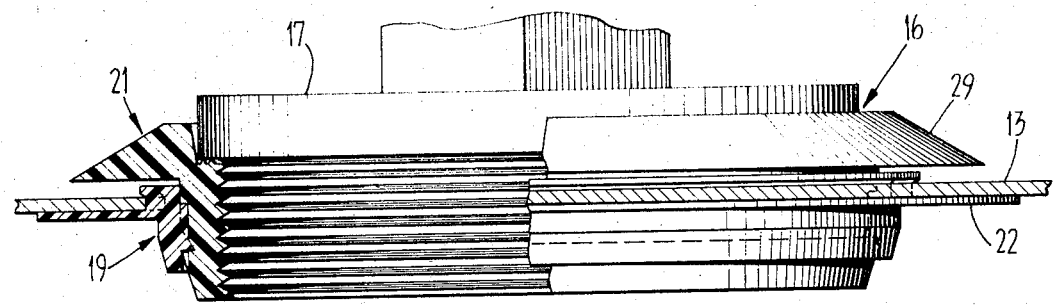
FIG_5
INVENTOR.
ROLAND A. FULGHUM
BY *Ralph S. Arnold*
AGENT United States Patent Office 3,424,481
Patented Jan. 28, 1969

3,424,481
CLOSURE FITTING FOR DRUMS
Roland A. Fulghum, St. Louis, Mo., assignor to Strecton Industries Incorporated, Millbrae, Calif.
Filed Mar. 29, 1967, Ser. No. 626,863
U.S. Cl. 285—162    7 Claims
Int. Cl. B65d 25/38, 41/08

ABSTRACT OF THE DISCLOSURE

A plastic fitting for the bung hole of a drum which may be installed subsequent to assembly of the drum. The fitting includes a female part engaged with the periphery of the bung hole in a snap fit, and a male part engaging the female part with a forced fit to establish a positive seal between the fitting and drum head. The fitting is also suited to use in the support of a plastic film liner within the drum.

*Background of the invention*

Drums of the type employed to transport and store oil, chemicals, etc., are typically provided with metallic rim structure encompassing the bung hole formed in the drum head. The rim structure is appropriately threaded, or otherwise arranged, for the securance of a bung thereto in closing relation to the hole. Securance of the rim structure to the head has involved welding, or other mechanical manufacturing processes which are relatively costly. In addition, with various schemes for reusing a drum, such as by installing a plastic film liner therein, it is desirable that the liner be sealably secured to the margin of the bung hole. A satisfactory seal between the plastic liner and the metallic structure adjacent the bung hole cannot be directly provided. To circumvent the foregoing difficulties, various plastic fittings have been devised which may be installed adjacent a bung hole with relative ease and to which a plastic liner may be sealably secured. However, heretofore plastic fittings have not been suited to installation on a tight head drum subsequent to assembly of the drum with the heads in fixed attachment to the drum body. In this regard, the fitting has been installed on the head prior to securance of the head to the body. In some instances, such as in the reuse of a drum, the seamed joint between the head and body is broken and the head removed to permit installation of a plastic fitting having a plastic liner sealably secured thereto. Thereafter, the head is placed on the body, and the joint is reseamed. This procedure is of course relatively complex and costly to the extent that very little advantage is gained in reusing a drum rather than using a new drum.

*Summary of the invention*

The invention is concerned with an improved plastic closure fitting for a drum head which may be readily installed in the bung hole of a tight head drum subsequent to assembly of the drum. The fitting includes interlocking male and female parts which upon assembly in a bung hole establish a forced fit positive seal with the drum head. The female part is annular, relatively flexible, and is provided with means for snap fitting engagement with the margin of the bung hole. The male part is relatively rigid and engaged in the bore of the female part in forced fitting relationship to establish a positive seal between the respective parts as well as between the female part and bung hole margin. The male part is further provided with an internally threaded bore for securance of a bung therein. The male and female parts have complementary portions in interengaged snap fitting relationship to prevent relative coaxial movement therebetween. In addition, the female part may be provided with a flange engageable with the interior face of the drum head, which flange serves as an element for the attachment of a plastic film liner to the fitting.

*Brief description of the drawing*

FIGURE 1 is a fragmentary cross sectional view of a drum having a fitting in accordance with the present invention installed thereon and secured to a plastic film liner disposed interiorly of the drum.

FIGURE 2 is a view similar to FIGURE 1, but depicting the fitting in the absence of a liner.

FIGURE 3 is an exploded fragmentary cross sectional view of the fitting, illustrating the manner in which the fitting is installed in the bung hole of a drum head.

FIGURE 4 is a plan view of the fitting with portions broken-away and shown in section.

FIGURE 5 is an elevational view of the fitting with portions broken-away and shown in section.

*Description of the preferred embodiment*

Referring now to the drawing, FIGURES 1 and 2 in particular, there is shown a tight head drum 11 including a cylindrical body 12 having a drum head 13 permanently secured thereto. The head is provided with a bung hole 14 in which there is installed a closure fitting 16, in accordance with the present invention, arranged to receive a bung 17 in sealed closing relationship. The fitting is of a plastic, such as polyethylene, and adapted to use as a readily installable fitting for facilitating securance of the bung, or as a fitting for facilitating sealed securance of a plastic liner 18 to the bung hole, as well as securance of the bung in sealed closing relation to the liner opening.

Considering now the closure fitting 16 in detail as to the preferred structure thereof, and referring to FIGURES 3–5, the fitting will be seen to include a female part 19 adapted for snap fitting engagement with the periphery of the bung hole 14, and a male part 21 adapted to engage the female part in forced fitting relationship. By virtue of the forced fit, the female part is urged into intimate engagement with the periphery of bung hole, and the male and female parts are maintained in intimate engagement with each other. More particularly, the female part is of annular configuration and formed with an outwardly flared annular flange 22 intermediate the opposite longitudinal ends of the part. A peripheral groove 23 is formed in the female part 19 immediately above the flange, the flange thereby defining the lower surface of the groove. In addition, the female part is provided with an interiorly projecting annular ridge 24 of preferably V-shaped configuration in cross-section. In this regard, the upper surface of the ridge is inwardly and downwardly inclined from the inner periphery of the part and terminates in the lower surface of the ridge which extends right angularly inward from the inner periphery. The lower surface of the ridge thus defines an inwardly stepped shoulder 26.

The female part is sufficiently thin as to be flexible such that the part may be folded to permit insertion through the bung hole 14. Subsequent to insertion, the part is unfolded interiorly of the drum and urged upwardly against the interior face of the head 13 marginally adjacent the hole. The part has sufficient give to enable the upper portion thereof to be urged upwardly through the hole to thereby engage the edge or margin of the hole in the groove 23 with a snap fit. With the female part thus installed in the bung hole, the flange 22 engages the interior face of the head 13 about the hole. In order to prevent rotation of the female part in the bung hole, the part is preferably formed with a pair of diametrically opposed longitudinally extending ribs 27 on the upper peripheral portion thereof, such ribs terminating downwardly at the flange 22. The ribs engage notches 28 provided in the edge of the bung hole.

The male part 21 is relatively rigid and of annular form having an outside diameter slightly greater than the inside diameter of the female part 19. The male part has an outwardly flared annular flange 29 at its upper end, and a peripheral relief groove 31 at its lower end, such groove having a configuration complementary to that of the ridge 24. The groove 31 downwardly defines a compressible outwardly projecting lip 32. The male part is internally threaded as indicated at 33 and is provided with an enlarged outwardly stepped shoulder 34 at the upper end of the bore through the part. The internally threaded bore and shoulder 34 serve to receive the bung 17. To complete the fitting, the male part 21 is provided with a plurality of circumferentially spaced grooves 36 extending longitudinally upward from the groove 31 at preferably 90° intervals. The grooves 36 receive complementary ribs 37 formed on the bore of the female part which extend longitudinally upward from the ridge 24, and thereby serve to prevent rotation of the male part within the female part.

With the fitting thus provided and the female part installed in the bung hole 14 as previously described, the male part is forced coaxially downward into the female part, as indicated by the arrow in FIGURE 3, with the aid of, for example, a mallet. The grooves 36 are, of course, aligned with the ribs 37 during this procedure. The ridge 24 and lip 32 are compressed during forced insertion of the male part and the lip then snaps outward to lock under the shoulder 26. The ridge is thus received in the groove 31 to lock the male and female parts together. By virtue of the forced fit between the male and female parts, a tight fit between the overall fitting and drum head is obtained. By virtue of the ribs 27, 37 and grooves 28, 36 turning of the male part relative to the female part, and of the overall fitting relative to the drum head is prevented. With the fitting thus installed in the bung hole, the bung 17 may be screwed into the bore of the male part to thereby provide closure of the bung hole. In the event the plastic liner 18 is to be employed in the drum 11 to facilitate reuse thereof, such liner is sealably secured to the flange 22 of the female part 19 as by means of a heat seal. The female part being foldable, the composite package of the female part and liner may be readily introduced to the interior of the drum 11 through the bung hole 14. The female part may then be secured to the periphery of the bung hole in the manner previously described and the male part engaged in the female part. The liner is thereby sealably secured to the margin of the bung hole through the intermediary of the overall fitting, and the bung may be secured thereto to provide sealed closure of the liner.

What is claimed is:

1. A closure fitting for installation in the bung hole of a tight head drum comprising an annular female part of flexible dimensionally non-compressible plastic having means for snap fitting engagement with the edge of the wall of the head of said drum marginally defining said hole, and an annular male part of relatively rigid dimensionally non-compressible plastic engaged in the bore of said female part in force fitting relationship, said male part having an internally threaded bore for receiving an externally threaded bung, said female and male parts having preformed complementary portions in interengaged positively locked snap fitting relationship preventing relative coaxial movement therebetween.

2. A closure fitting according to claim 1, further defined by said female part and edge of said wall marginally defining said hole having complementary interengaged portions preventing relative rotation therebetween.

3. A closure fitting according to claim 1, further defined by said female part having an outwardly flared annular flange at its lower end and a peripheral groove immediately upwardly adjacent said flange, said groove engaged by the edge of said wall marginally defining said hole and said flange engaging the interior face of the head of said drum, said female part having an inwardly projecting annular ridge, said male part having a peripheral groove complementary to said ridge and engaged thereby, said ridge and groove being said interengaged portions.

4. A closure fitting according to claim 3, further defined by said ridge having a V-shaped configuration in cross-section defined by an upper surface downwardly and inwardly inclined from the peripheral wall of said female part defining the bore thereof and terminating downwardly in a lower surface extending right-angularly inward from the peripheral wall of said female part defining the bore thereof.

5. A closure fitting according to claim 3, further defined by said female part having longitudinally extending ribs on the upper peripheral portion thereof terminating downwardly at said flange and engaging notches in the edge of said wall marginally defining said hole, said female part having ribs on the peripheral wall thereof defining the bore thereof extending longitudinally upward from said ridge, said male part having grooves in the periphery thereof extending longitudinally upward from said peripheral groove receiving said ribs on the peripheral wall of said female part defining the bore thereof.

6. A closure fitting according to claim 5, further defined by said ridge having a V-shaped configuration in cross-section defined by an upper surface downwardly and inwardly inclined from the peripheral wall of said female part defining the bore thereof and terminating downwardly in a lower surface extending right-angularly inward from the peripheral wall of said female part defining the bore thereof.

7. A closure fitting according to claim 6, further defined by said male part having an outside diameter slightly greater than the inside diameter of said female part.

References Cited

UNITED STATES PATENTS

| 2,314,315 | 3/1943 | Scheele | 285—213 |
| 2,889,847 | 6/1959 | Schober. | |
| 2,916,311 | 12/1959 | Keplinger | 285—202 |
| 2,947,071 | 8/1960 | Marchant. | |
| 3,087,655 | 4/1963 | Scholle. | |
| 3,133,777 | 5/1964 | Anhalt. | |

FOREIGN PATENTS

| 101,689 | 10/1916 | Great Britain. |
| 1,363,045 | 4/1964 | France. |

THOMAS F. CALLAGHAN, *Primary Examiner.*

U.S. Cl. X.R.

285—203; 220—39